United States Patent [19]

Lu

[11] Patent Number: 5,108,423
[45] Date of Patent: Apr. 28, 1992

[54] NIPPLE ASSEMBLY WITH ALARM BUZZER AND BODY TEMPERATURE INDICATOR (I)

[76] Inventor: Jieh-Shan Lu, 56, Alley 115, Shing Her Ln., Jang Her Li,, Nan Tour City, Taiwan

[21] Appl. No.: 632,479

[22] Filed: Dec. 21, 1990

[51] Int. Cl.⁵ .................. G01K 13/00; A61J 17/00
[52] U.S. Cl. ..................... 606/234; 606/235; 606/236; 128/859; 374/151
[58] Field of Search ........... 128/859; 340/584, 595, 340/596; 374/151; 606/234, 235, 236

[56] References Cited

U.S. PATENT DOCUMENTS

| | | | |
|---|---|---|---|
| 3,913,402 | 10/1975 | Doyle | 374/151 |
| 3,968,690 | 7/1976 | Blouin et al. | 374/151 |
| 4,511,265 | 4/1985 | Berndt | 374/151 |

FOREIGN PATENT DOCUMENTS

| | | | |
|---|---|---|---|
| 0166069 | 1/1986 | European Pat. Off. | 374/151 |
| 0039434 | 4/1981 | Japan | 374/151 |

Primary Examiner—Robert A. Hafer
Assistant Examiner—Brian E. Hanlon
Attorney, Agent, or Firm—Bacon & Thomas

[57] ABSTRACT

A nipple assembly with an alarm buzzer and a body temperature indicator. The assembly comprises a nipple base in which is accommodated a main case and an inner case as well as a ring-shaped thermometer attached thereto. In the main case are provided an inner case, an IC board, a heat sensitive resistor and a buzzer. A heat conductive liquid is filled in the sealed space defined by the base, the main case, and the inner case. At the rear end of the base is attached a transparent convex housing to which is fastened a handle with a battery. When a baby sucks the nipple of the assembly, the heat in the baby's mouth can be transferred through the liquid to the thermometer so that it can indicate the baby's body temperature. Moreover, when the baby's body temperature reaches a predetermined warning value, a signal from a heat sensitive resistor will be sent to the buzzer so that the latter can issue an alarming sound.

1 Claim, 4 Drawing Sheets

NIPPLE ASSEMBLY WITH ALARM BUZZER AND BODY TEMPERATURE INDICATOR (I)

BACKGROUND OF THE INVENTION

This invention relates to a nipple assembly, specifically a nipple assembly with an alarm buzzer and a body temperature indicator. Within this assembly is provided a liquid of good heat conductivity, such as distilled clean water, for transferring the heat from a baby's mouth to a thermometer which is provided together with a heat sensitive resistor in the assembly. The thermometer is capable of indicating the baby's body temperature, and when the baby's body temperature exceeds a predetermined upper limit, the heat sensitive resistor sends a signal to the alarm buzzer so that the buzzer is actucated to issue an alarming sound. Thereby, the body temperature of the baby sucking the nipple of the assembly in accordance with the invention can be monitored to protect the baby from being harmed by overhigh body temperature which can induce other aftersymptoms or even cause a whole-life regret.

Small families are the primary constituting units of the modern society in which babies are usually cared for by young busy inexperienced parents or even by the person working for a day nursery. In these circumferences, the babies' body temperatures are often neglected by their parents or the person who takes care of them. Especially in a day nursery, it is hard for the person who take care of the babies to know which baby is getting an overhigh temperature because he cannot let every baby to put a thermometer in his mouth all the time. This commonly existing problem in the modern society constitutes a potential risk to the babies' health and lives.

Accordingly, the primary object of the invention is to provide a nipple with a body temperature indicator for a baby's daily suction, in which the nipple is sealedly filled with distilled clean water of any other appropriate liquid through which the heat from the baby's mouth can be transferred to a specific indicator so that the baby's parents or the person who cares for the baby can clearly observe the fluctuation in the baby's body temperature.

Another object of the invention is to provide a nipple assembly with an alarm buzzer, in which assembly is provided a heat sensitive resistor in connection with the buzzer through an IC so that the buzzer will be energized and issue an alarming sound when the temperature of the liquid in the nipple assembly reaches a warning point.

BRIEF SUMMARY OF THE INVENTION

To achieve these objects, a nipple assembly with an alarm buzzer and a body temperature indicator in accordance with the invention consists of a base, a main case, an inner case, a thermometer, a transparent cover, an IC board, a heat sensitive resistor, an alarm buzzer, a transparent convex housing, and a handle provided with a battery therein. The sealed space formed in said assembly is filled with a heat conductive liquid.

The case is formed as a pot-shaped thin shell with a central hole. At the open end of the pot is provided an inwardly extending circular flange. On the outer circumference of the case is provided a plurality of glue pits for accommodating a waterproof glue which is used to attach the case to the base.

The inner case is formed as a thin shell consisting of a cylindrical hollow projection and a flange. In the wall of the projection is formed a plurality of liquid guiding slots. Moreover, the projection can just be fitted in the central hole in the main case. When the projection is fitted in the central hole, the thermometer can be disposed within the space formed between the flange and the main case.

A liquid, such as mercury, alcohol, or kerosene, is contained in the glass tube of the ring-shaped thermometer and is used as an temperature index of the contraction-and-expansion type indicating substance. A temperature sensing projection is provided on the thermometer. The thermometer is adhesively bonded to the main case and the inner case by a waterproof glue. A waterproof ring is sealingly fitted between the thermometer and the inner case, and a waterproof ring between the thermometer and the main case. The main case is also attached to the base by a waterproof glue so that a space is sealedly formed by the base, the main case, the inner case, the ring-shaped thermometer, and the two waterproof rings.

The liquid of good heat conductivity is filled in the space so that when a baby sucks the nipple of the assembly, the heat in the baby's mouth can be transferred through the liquid to the thermometer for indicating the baby's body temperature. Moreover, when the heat conductive liquid reaches a predetermined warning temperature, a signal from the heat sensitive resistor will be sent through the IC board to the alarm buzzer and the buzzer is energized and issues an alarming sound to attract the attention of the person who cares for the baby.

BRIEF DESCRIPTION OF THE DRAWINGS

A preferred embodiment of the invention will now be described by way of example and with reference to the accompanying drawings, in which.

DETAILED DESCRIPTION OF THE INVENTION

Figure 1:
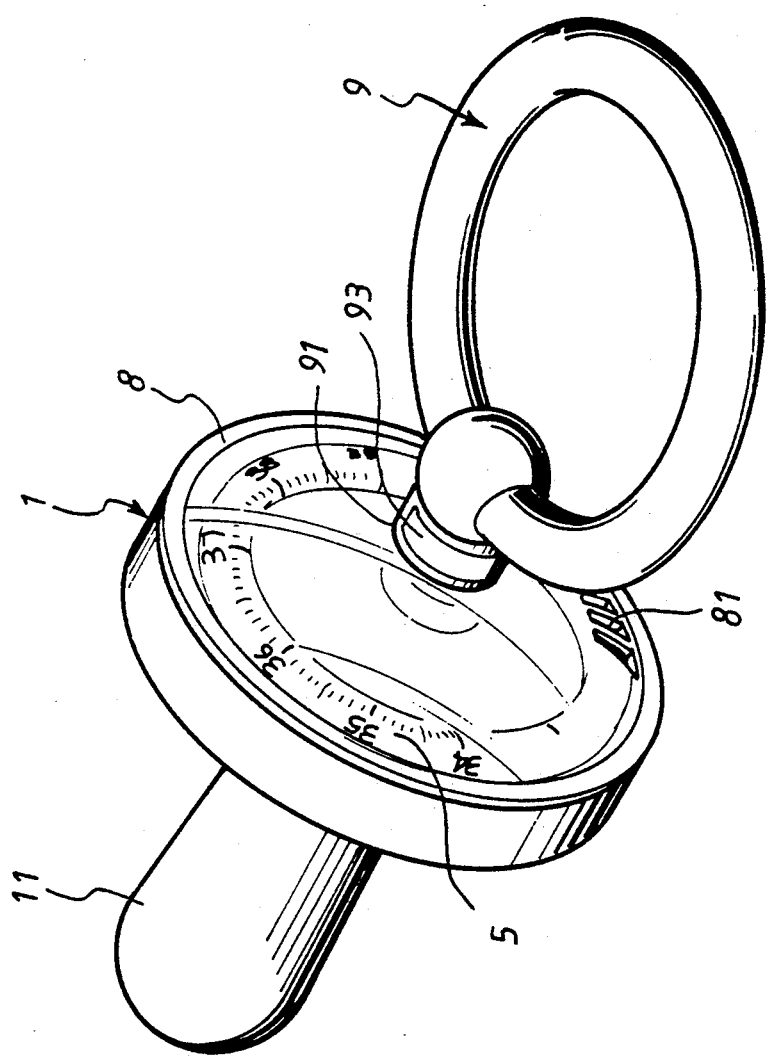
FIG. 1 is an outside view of a nipple assembly in accordance with the invention.

Referring to FIG. 1 which is an outside view of a nipple assembly in accordance with the invention, a person who faces the baby sucking the nipple can clearly read the body temperature indicated by the ring-shaped thermometer 5 through the magnification effect of a transparent convex cover 8 mounted on the back of the base 1. Moreover, a plurality of sound releasing openings 81 is provided in the cover 8. When the baby's body temperature reaches a predetermined warming point, a heat sensitive resistor 62 in the nipple assembly will become operative and consequently a buzzer 7 will issue an alarming sound through the openings 81 in the convex cover 8.

Figure 2:
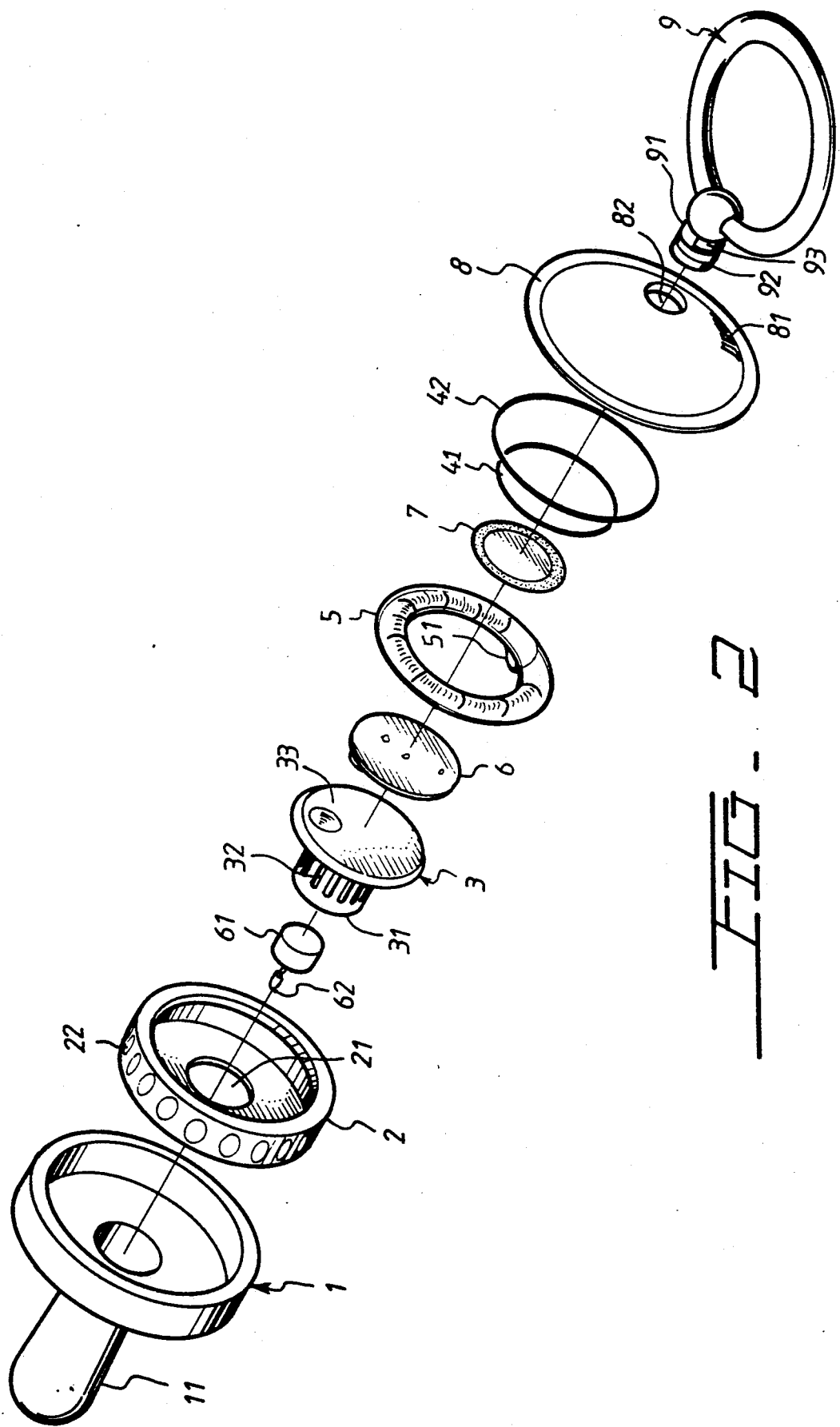
FIG. 2 is an exploded pictorial view showing the nipple assembly in accordance with the invention.
Figure 3:
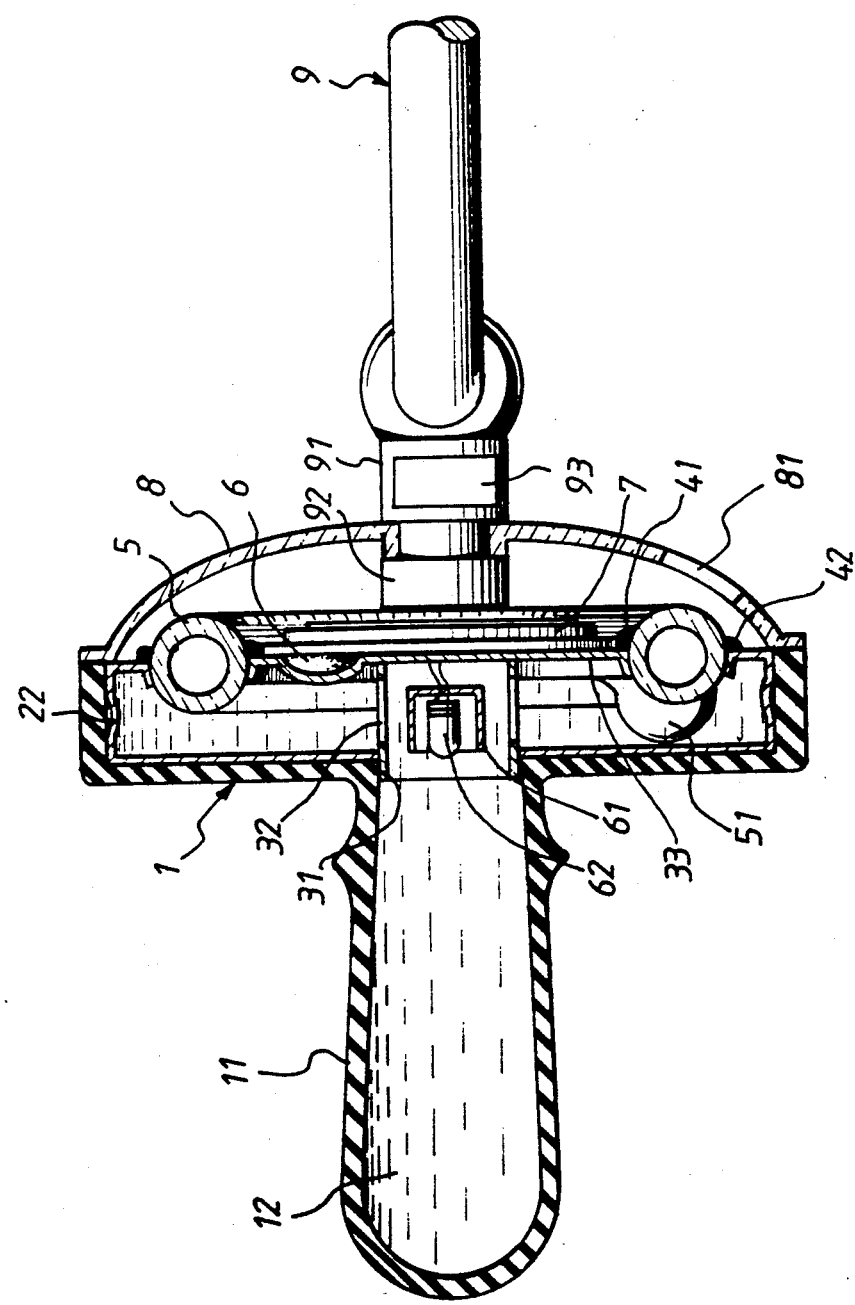
FIG. 3 is a sectional view showing the assembly in its assembled state.

Referring to FIGS. 2 and 3, the nipple assembly comprises the following primary elements listed in accordance with its disassembling order: a base 1 with a nipple 11, a main case 2, and an inner case 3. The base 1 is made of a pliable material of high density and has an opening on one side for receiving the main case 2 which is formed as a disk-shaped thin shell with a central hole 21. On the circumference of the main case 2 is provided a plurality of glue pits 22 for accommodating a waterproof glue by which the main case 2 can be adhered to the base 1. The inner case 3 is formed as a thin shell consisting of a cylindrical hollow projection 31 and a flange 33. In the wall of the projection 31 is formed a plurality of liquid guiding slots 32. Moreover, the projection 31 can just be fitted in the central hole 21 of the main case 2, as shown in FIG. 3. When the projection 31 is fitted in the central hole 21, a ring-shaped thermometer 5 can be disposed with in the space formed between the flange 33 and the main case 2.

A liquid, such as mercury, alcohol, or kerosene, is contained in the glass tube of the ring-shaped thermometer 5 and is used as an temperature index of the contraction-and-expansion type indicating substance. A temperature sensing projection 51 is provided on the thermometer 5. Once the ring-shaped thermometer 5 is fitted between the main case 2 and the inner case 3, it can be adhesively bonded to these two parts by a waterproof glue. In addition, a waterproof ring 41 may be sealingly fitted between the thermometer 5 and the inner case 3, and a waterproof ring 42 between the thermometer and the main case 2. Moreover, the main case 2 is attached to the base 1 by a waterproof glue so that a space is sealedly formed by the base 1, the main case 2, the inner case 3, the ring-shaped thermometer 5, and the two waterproof rings 41 and 42.

An IC board 6 is adhered to the rear side of the flange 33. Within the projection 31 is a heat sensitive resistor 62 disposed in a protection tube 61. The resistor is connected to the IC board 6 in series and the IC board is in turn connected to a buzzer 7 on the rear side thereof.

A transparent convex housing 8 is adhered to the rear end of the base 1 to enclose the above-mentioned components between the housing 8 and the base 1. The housing 8 is made of a transparent material and is formed into a convex disk shape so that it has a magnification function. The convex disk is formed with a connection opening 82 at the center thereof and is also formed with a plurality of sound releasing openings 81 near its circumference. A connection base 92 is fitted in the opening 82. The scale and display of the ring-shaped thermometer 5 are magnified by the transparent convex housing 8.

The handle 9 can be formed in a ring or any other appropriate shape for holding by hand and is made of a pliable emulsion colloid. The handle 9 is attached with a battery seat 91. A mercury battery or any other small battery 93 can be disposed within the seat 91. Adjacent the seat 91 is a connection base 92 which can be pressed and retained in the opening 82. The battery 93 supplies the elastic energy required by the IC board 6, the heat sensitive resistor 62, and the alarm buzzer 7.

Figure 4:
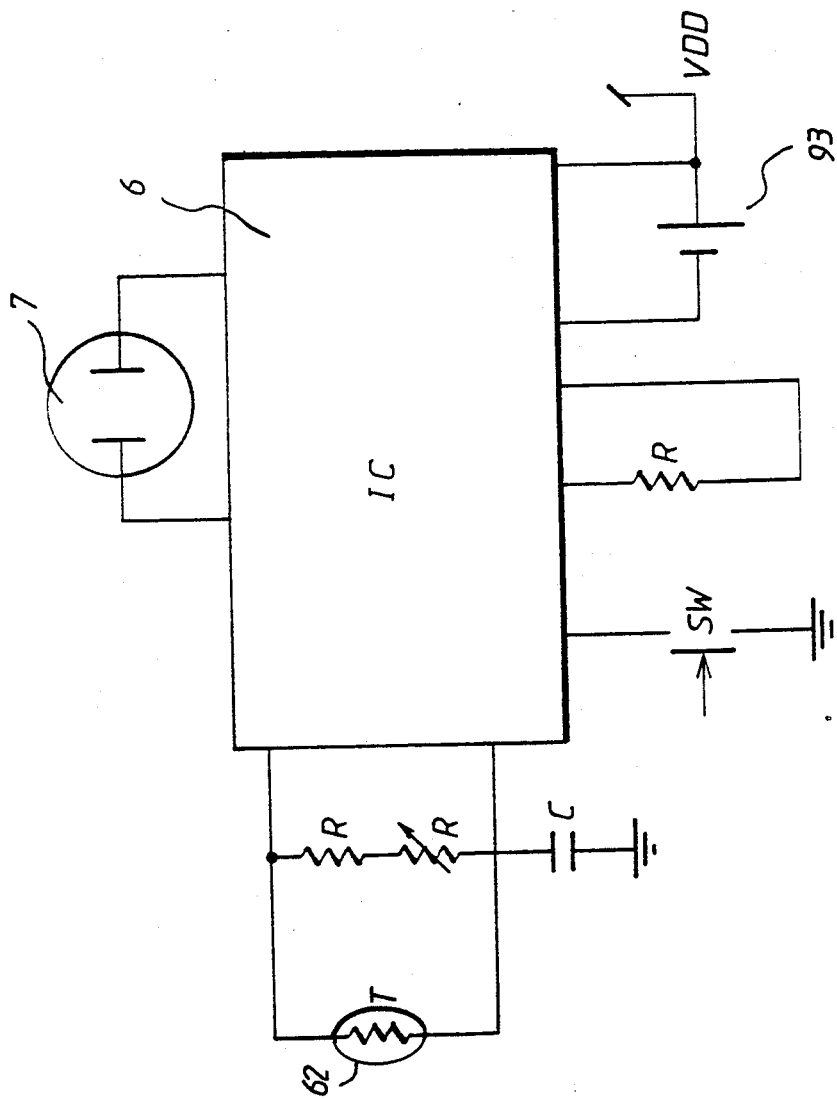
FIG. 4 is a schematic view showing the circuit used in the assembly in accordance with the invention.

A liquid 12 of good heat conductivity can be filled within the sealed space defined by the base 1, the main case 2, the inner case 3, and the ring-shaped thermometer 5 so that heat can be transferred from the mouth of the baby through the nipple 11 of the base 1 to the liquid 12 within the nipple 11. When the nipple 11 is sucked and pressed by the baby's mouth, the liquid therein will flow in the sealed space by passing through the liquid guiding openings 32 and thus the heat in the liquid can be transferred to the heat sensing projection 51 of the thermometer 5 so that the temperature of the liquid can be indicated. Furthermore, when the heat coductive liquid 12 reaches a predetermined warning temperature, a signal from the heat sensitive resistor 62 will be sent through the IC board 6 to the alarm buzzer 7. Thus, the buzzer 7 is energized and issues a sound through the sound releasing openings 81 in the convex cover 8 to attract the attention of the person who cares for the baby. The circuit in accordance with the invention is schematically shown in FIG. 4.

While only one preferred embodiment of the invention has been shown and described, it will be understood that this invention is not limited thereto since modifications can be made and will become apparent to those skilled in the art.

I claim:

1. A nipple assembly with an alarm buzzer and a body temperature indicator consisting of a nipple base, a main case, an inner case, a thermometer, an IC board, a heat sensitive resistor, an alarm buzzer, a transparent convex housing, and a handle provided with a battery therein, the sealed space formed in said assembly being filled with a heat conductive liquid, characterized in that:

said main case is in the form of a pot-shaped hard thin shell with a central hole, at the open end of the pot is provided an inwardly extending circular flange, on the outer circumference of said case is provided a plurality of glue pits for accommodating a waterproof glue which is used to attach said case to said nipple base;

said inner case is formed as a thin shell consisting of a cylindrical hollow projection and a disk-like bottom pan, in the wall of the projection is formed a plurality of liquid guiding slots, the bottom end of said projection is joined with said bottom pan, and the projection is fitted and adhered within the central hole of said main case;

a liquid is contained in a glass tube of a ring-shaped thermometer and is sued as an temperature index of the contraction-and-expansion type indicating substance, a temperature sensing projection is provided on said thermometer, said ring-shaped thermometer is fitted between said main case and said inner case, said thermometer is adhesively bonded to these two parts by a waterproof glue, a waterproof ring is sealingly fitted between said thermometer and said inner case, and another waterproof ring between the thermometer and the main case so that a space is sealingly formed by said base, main case, inner case, ring-shaped thermometer and two waterproof rings; and said liquid is filled in said sealed space whereby when a baby sucks the nipple attached to said base of said assembly, the heat in the baby's mouth can be transferred through said liquid to said heat sensing projection of said thermometer for indicating the body temperature of the baby; moreover, when the heat conductive liquid reaches a predetermined warning temperature, a signal from the heat sensitive resistor will be sent through said IC board to said alarm buzzer and said alarm buzzer is energized and issues an alarming sound to attract the attention of the person who cares for the baby; and a battery provided in said handle supplies the energy required by said assembly.

* * * * *